United States Patent
Li

(10) Patent No.: US 9,563,211 B2
(45) Date of Patent: Feb. 7, 2017

(54) MULTIPLE OUTPUT CHARGE PUMP WITH PEAK VOLTAGE FOLLOWING FREQUENCY DIVIDER CONTROL

(71) Applicant: ATI Technologies ULC, Markham (CA)

(72) Inventor: David King Wai Li, Toronto (CA)

(73) Assignee: ATI Technologies ULC, Markham (CA)

( * ) Notice: Subject to any disclaimer, the term of this patent is extended or adjusted under 35 U.S.C. 154(b) by 945 days.

(21) Appl. No.: 13/865,266

(22) Filed: Apr. 18, 2013

(65) Prior Publication Data

US 2014/0312710 A1    Oct. 23, 2014

(51) Int. Cl.
  *G05F 1/10*    (2006.01)
  *H02M 3/07*    (2006.01)
  *H02M 1/00*    (2006.01)

(52) U.S. Cl.
  CPC ............ *G05F 1/10* (2013.01); *H02M 3/07* (2013.01); *H02M 2001/008* (2013.01); *Y10T 307/74* (2015.04)

(58) Field of Classification Search
  CPC ...... G05F 1/10; H02M 3/07; H02M 2001/008; Y10T 307/74
  See application file for complete search history.

(56) References Cited

U.S. PATENT DOCUMENTS

| | | | | |
|---|---|---|---|---|
| 4,068,262 A | * | 1/1978 | Sandler | H04N 11/00 348/E11.001 |
| 5,955,978 A | * | 9/1999 | Fiedler | H03M 1/1023 341/118 |
| 6,173,240 B1 | * | 1/2001 | Sepulveda | G05B 17/02 700/121 |
| 2006/0068697 A1 | * | 3/2006 | Tanabe | H03F 1/0244 455/1 |
| 2012/0249238 A1 | | 10/2012 | Bartram | |
| 2013/0021827 A1 | * | 1/2013 | Ye | H03F 1/025 363/17 |

OTHER PUBLICATIONS

Analogic Tech, "Multi-Mode Charge Pump for White LED Backlight and Flash Applications", AAT2801 Data Sheet, Jan. 1, 2006, 20 pages.

(Continued)

*Primary Examiner* — Zeev V Kitov

(57) ABSTRACT

A power converter for a load with varying power requirements dynamically adjusts its supply voltage to the load so as to track the radio frequency (RF) envelope of the signal being carried by the load. The supply voltage can be provided by a multiple-output charge pump providing multiple output voltage levels concurrently, and a switch to provide a selected one of the different output voltage levels as the supply voltage to the load. A controller controls the switch to dynamically modify the voltage level selected for output as the supply voltage such that the supply voltage tracks the RF envelope of the signal being carried by the load. As the switching losses of transistors of the power converter may exceed the power savings achieved through envelope tracking, the power converter employs a peak following frequency divider circuit that limits the switching frequency of the power converter to a threshold frequency.

16 Claims, 6 Drawing Sheets

(56) References Cited

OTHER PUBLICATIONS

Nujira Ltd., "Envelope Tracking technology overview", Accessed at [[http://www.nujira.corn/technology-pa-746.php]] on Jan. 9, 2013, 2 pages.
Nujira Ltd., "High Accuracy Tracking (HAT)", Accessed at [[http://www.nujira.com/high-accuracy-tracking-hat-pa-769.php]] on Jan. 9, 2013, 2 pages.
Louie Pylarinos, "Charge Pumps: An Overview", Department of Electrical and Computer Engineering University of Toronto, May 25, 2003, 7 pages.
Gerard Wimpenny, "Improving multi-carrier PA efficiency using envelope tracking", Nujira Ltd., [[http://www.eetimes.com/General/PrintView/4018959]], Mar. 2, 2008, 6 pages.
Gerard Wimpenny, "Understand and characterize envelope-tracking power amplifiers", Nujira Ltd., [[http://www.eetimes.com/General/PrintView/4233749]], Jan. 3, 2012, 9 pages.

\* cited by examiner

MULTIPLE OUTPUT CHARGE PUMP WITH PEAK VOLTAGE FOLLOWING FREQUENCY DIVIDER CONTROL

BACKGROUND

Field of the Disclosure

The present disclosure relates generally to power converters and relates more specifically to envelope-tracking power converters.

Description of the Related Art

Direct-current-to-direct-current (DC-DC) power converters often are used to supply power to loads that vary in voltage. One example is the use of an envelope-tracking power amplifier for the transmission of signals with high peak-to-average power ratios, such as for radio frequency (RF) signaling frequently found in wireless and cellular applications. Typically, the envelope-tracking power amplifier includes a control circuit that dynamically modifies the supply voltage of the power amplifier to track the RF envelope of the transmitted signal, such that changes in the supply voltage correspond to changes in the instantaneous power of the transmitted signal. In this manner, power can be conserved by ensuring that the power supplied to the power amplifier more closely tracks the instantaneous power of the transmitted signal. The DC-DC power converters used in such systems typically are buck converters or other switching-based power converters that are required to switch at a minimum frequency that matches the frequency of the signal being transmitted. The power losses resulting from switching the typical transistors of such DC-DC power converter at higher frequencies, such as at a channel bandwidth of 20 megahertz (MHz) often found in wireless systems, can exceed the power losses that would have occurred had a constant-voltage power converter been employed instead, thereby negating the benefits of envelope tracking. The usual result in this scenario is excessive power consumption, which manifests as overheating of the power converter. Conventional solutions to the excessive transistor switching losses involve implementing more advanced, specialized transistor devices. Such transistors are expensive and thus these approaches often are cost-prohibitive. Moreover, the DC-DC power converters in conventional envelope tracking applications typically utilize inductors, thereby complicating their manufacture and implementation in a system-on-a-chip.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-6 illustrate techniques for power conversion employing frequency-limited envelope tracking. In some embodiments, a power converter for a power amplifier or other load with varying power requirements dynamically adjusts its supply voltage to the load so as to track the radio frequency (RF) envelope of the signal being carried by the load. The supply voltage can be provided by a multiple-output charge pump (MOCP) that provides multiple output voltage levels concurrently, each output voltage level corresponding to an envelope step, and a switch to provide a selected one of the different output voltage levels as the supply voltage to the load. An envelope tracking controller controls the switch to dynamically modify the supply voltage such that the supply voltage tracks the RF envelope of the signal being carried by the load.

As the switching losses of transistors of the power converter may exceed the power savings achieved through envelope tracking, in some embodiments the power converter employs a peak following frequency divider (PFFD) circuit that limits the switching frequency of the power converter to a specified threshold frequency, at which point the power converter converts to a partial-step envelope tracking mode whereby the switching frequency of the power converter among the various voltage levels for the output, or supply, voltage is limited to the specified threshold frequency. Under this approach, excessive switching losses at higher frequencies can be avoided, thereby allowing conventional transistor devices to be used in the power converter without excessive power consumption and without overheating. Moreover, in some embodiments the MOCP is implemented as a switched-capacitor charge pump, thereby facilitating its fabrication using conventional metal-oxide-silicon (MOS) technology and thus allowing for implementation in an SOC using conventional semiconductor fabrication technologies.

For ease of illustration, various embodiments of the MOCP and the frequency-limited envelope tracking controller are described in the example context of a radio frequency (RF) amplifier. However, the techniques described herein are not limited to RF amplification applications, but also may be implemented to provide a dynamically varying supply voltage to any of a variety of loads carrying analog input signals that vary in voltage or instantaneous power. Examples of such other applications include audio amplification for speakers or other audio applications, the control of vibration motors in video gaming devices or in biomedical devices, the control of fan speeds in graphics cards, and the like.

Figure 1:
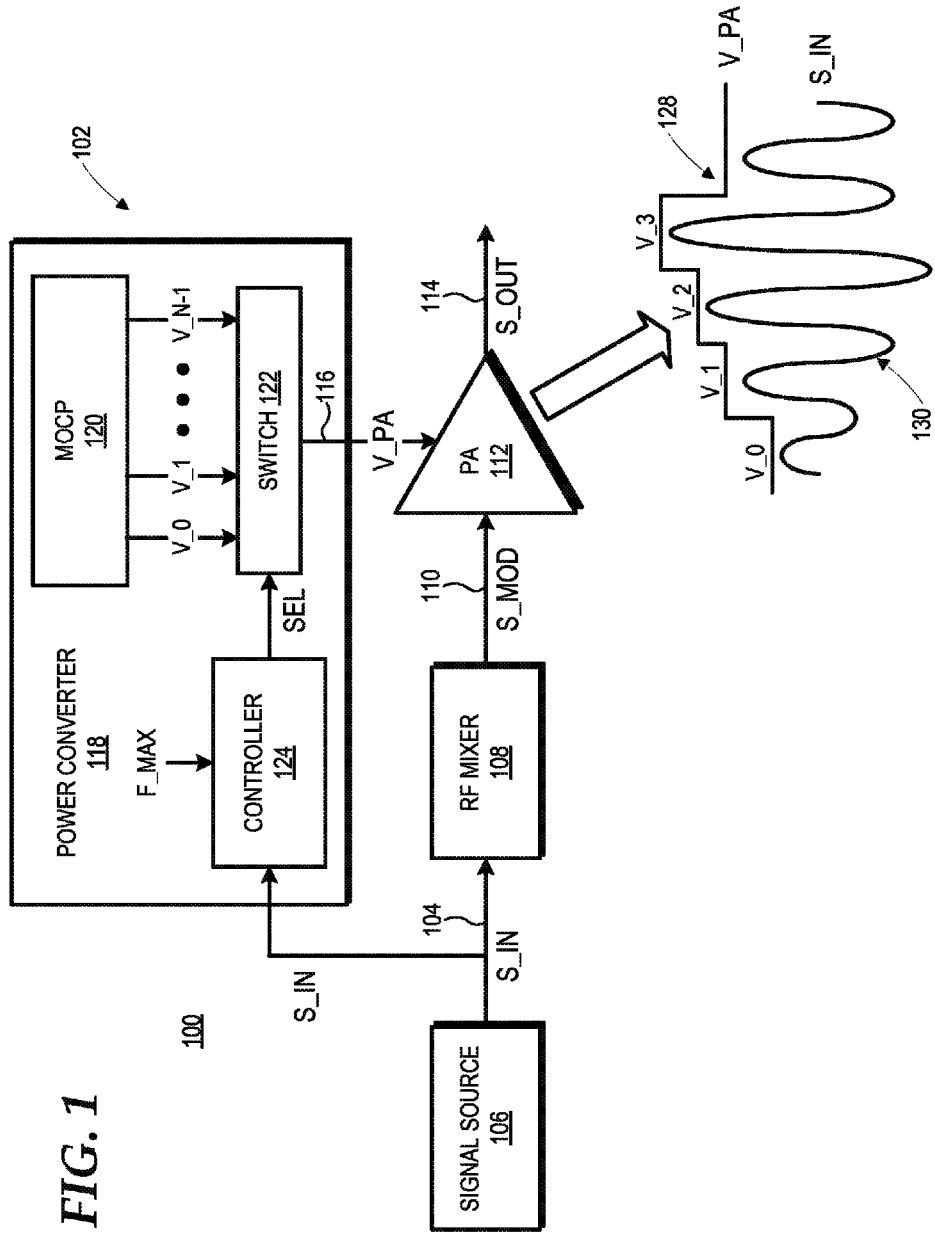
FIG. 1 is a block diagram illustrating a power amplifier and power converter utilizing frequency-limited envelope tracking in accordance with some embodiments.

FIG. 1 illustrates an electronic device 100 implementing an envelope-tracking RF amplifier 102 in accordance with some embodiments. The electronic device 100 can comprise any of a variety of devices used to transmit RF signaling via the envelope-tracking RF amplifier 102, such as a smart phone, cellular phone, notebook computer, electronic book reader, wireless-enabled printer, or other device that communicates RF signaling with a cellular tower, wireless local area network (WLAN) base station, or peer in a wireless peer-to-peer network. In operation, the RF amplifier 102 receives an analog input RF signal 104 (denoted "S_IN") from a signal source 106 and frequency converts the input RF signal 104 by mixing it with an intermediate frequency (IF) signal using an RF mixer 108 to generate a modulated RF signal 110 (denoted "S_MOD"), whereby the modulated RF signal 110 is a representation of the input RF signal 104. The RF amplifier 102 employs a power amplifier 112 to amplify the modulated RF signal 110 so to generate an output RF signal 114 (denoted "S_OUT"). In some embodiments of the RF amplifier 102 as part of an RF transmitter of the electronic device 100, the input RF signal 104 is at a baseband frequency, and thus is upconverted by the RF mixer 108 to the intermediate frequency as the modulated RF signal 110.

The power amplifier 112 is powered via a supply voltage 116 (having a voltage denoted as "V_PA"). Typically, the input RF signal 104 has a high peak-to-average power ratio, or "crest factor," and thus the instantaneous power consumption of the power amplifier 112 materially varies with the variation in the RF envelope of the input RF signal 104. As such, it would be inefficient to supply a constant voltage level for the supply voltage 116 as the power amplifier 112 would unnecessarily waste power (and thus emanate excessive heat) when the input RF signal 104 is not close to its peak level. Accordingly, in some embodiments, the RF amplifier 102 includes an envelope-tracking power converter 118 to track the RF envelope of the input RF signal 104 so as to tune the level of the voltage level V_PA of the supply voltage 116 more closely to the instantaneous power requirements of the power amplifier 112.

The envelope-tracking power converter 118 includes a multiple-output charge pump (MOCP) 120, a switch 122, and a controller 124. The MOCP 120 is configured to receive an input voltage (not shown) and provide, via a plurality of outputs, N different output voltage levels in parallel. These output voltage levels are denoted "V_0", "V_1", . . . , "V_N−1" in FIG. 1. Each output voltage level represents a different envelope step on the voltage envelope provided for the supply voltage 116 so as to track the RF envelope of the input RF signal 104. To illustrate, FIG. 1 depicts an example voltage envelope 128 provided by the envelope-tracking power converter 118 that has 4 (N=4) envelope steps: V_0, V_1, V_2, and V_3 (corresponding to the output voltage levels output in parallel by the MOCP 120), which track the corresponding change in an RF envelope 130 of the input RF signal 104. The magnitude of the change in voltage between each envelope step may be constant or may vary. As described in greater detail below with reference to FIGS. 2 and 5, the MOCP 120 may be implemented as a switched-capacitor charge pump, and thus avoid the need for inductors in the charge pump.

The switch 122 includes a plurality of voltage inputs coupled to the voltage outputs of the MOCP 120, a select input to receive a select signal 126 (denoted "SEL"), and an output to provide the dynamically adjustable voltage level V_PA of the supply voltage 116. In operation, the switch 122 adjusts the voltage level V_PA to a selected envelope step by selecting between the N output voltage levels of the MOCP 120 based on the select signal 126. The controller 124 includes an input to receive the input RF signal 104 and an output to provide the select signal 126 based on sampled voltage levels of the input RF signal 104. The controller 124 controls the switch 122 via the select signal 126 so as to dynamically adjust the level of the voltage level V_PA of the supply voltage 116 so that the supply voltage 116 tracks the changes in the instantaneous power required by the power amplifier 112 in generating the output RF signal 114 from the input RF signal 104. In other embodiments, the controller 124 can receive the modulated RF signal 110 instead of the input RF signal 104 and dynamically adjust the supply voltage 116 based on the modulated RF signal 110 using the techniques described herein with respect to the input RF signal 104.

The controller 124 generally achieves envelope tracking by selecting a voltage level/envelope step for the supply voltage 116 to satisfy the corresponding instantaneous power requirement of the power amplifier 112 for the corresponding state of the input RF signal 104, but not excessively above the minimum necessary voltage level to do so. That is, the controller 124 attempts to select an envelope step for the voltage level V_PA that is "just right" for the instantaneous power anticipated to be consumed by the power amplifier 112 at the corresponding time. In this manner, less extraneous power is supplied to the power amplifier 112, and thus less heat is emanated by the power amplifier 112, thereby reducing the risk of overheating while also reducing overall power consumption by the electronic device 100.

As noted, the envelope tracking process involves switching the supply voltage 116 between the various voltage levels V_0 to V_N−1 to reflect the changing state of the input RF signal 104. The input RF signal 104 may operate at a frequency whereby the corresponding switching frequency of the transistors of the controller 124 and the switch 122 result in switching losses that are greater than the benefits that otherwise would be gained by full envelope tracking with the supply voltage 116. Accordingly, in some embodiments, the controller 124 employs a peak voltage following frequency divider (PFFD) (see, for example, FIG. 2) to limit the switching frequency of the supply voltage 116 to a specified maximum threshold frequency (denoted "F_MAX"), which may be selected based on the observed or estimated switching frequency at which the switching losses become greater than the benefits of full envelope tracking. The controller 124 operates in a "full" envelope tracking mode by switching between the various voltage levels V_0 to V_N−1 until the switching frequency reaches the specified threshold frequency F_MAX, at which point the controller 124 converts to a "partial" envelope tracking mode by switching between the various voltage levels at the threshold frequency F_MAX. In this manner, the controller 124 may ensure that the switching losses due to the envelope tracking process do not exceed the benefits that otherwise would be gained by the envelope tracking process, while also permitting the circuit designer to implement less expensive and more conventional transistor architectures, rather than being required to utilize expensive and complex transistor architectures in an attempt to reduce switching losses at higher frequencies.

Figure 2:
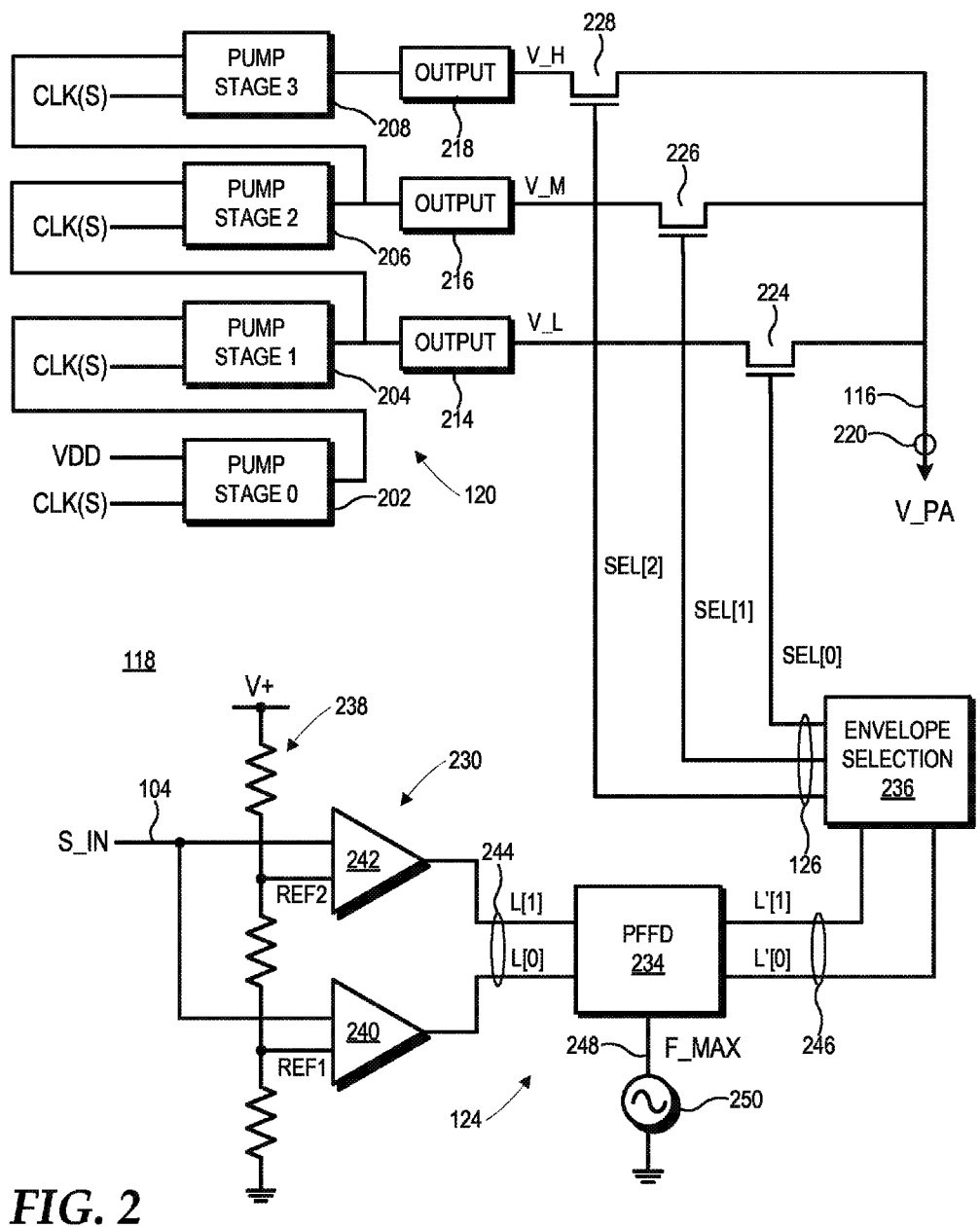
FIG. 2 is a diagram illustrating an envelope-tracking power converter for a power amplifier or other load with varying power requirements in accordance with some embodiments.
Figure 3:
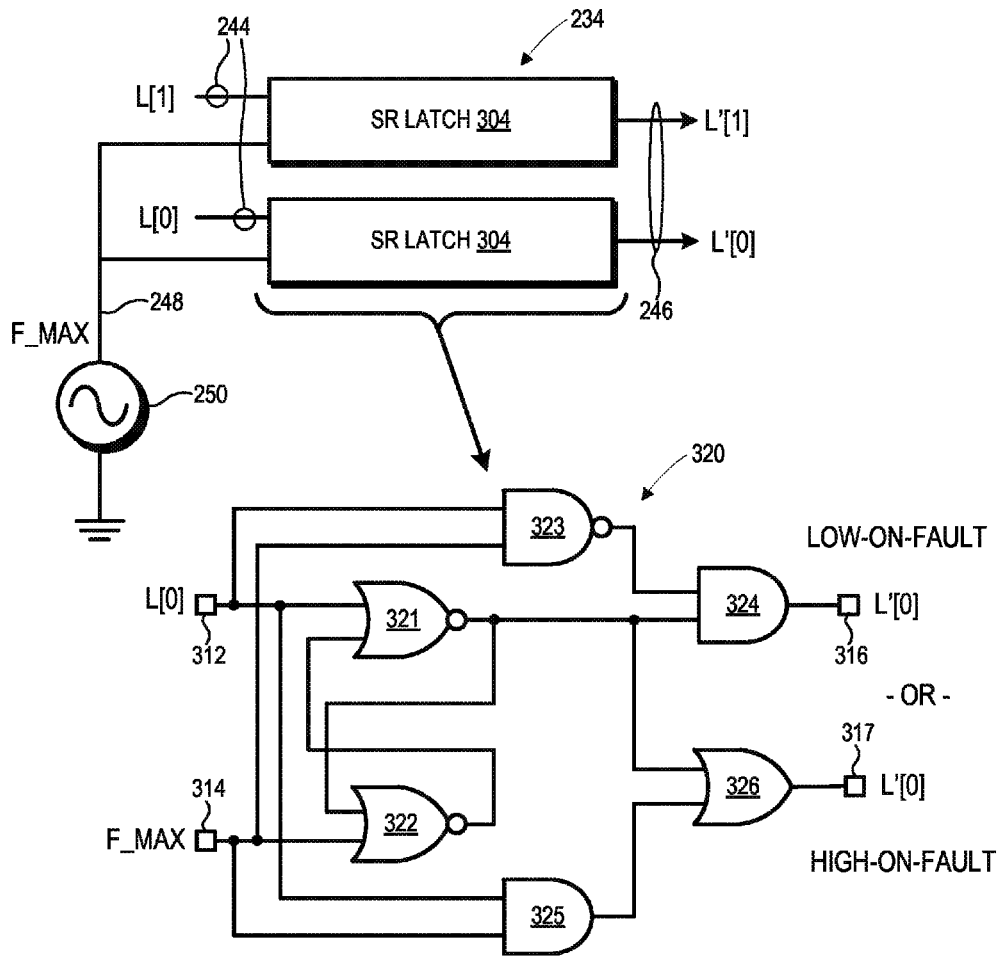
FIG. 3 is a diagram illustrating an example implementation of a peak following frequency division circuit of the envelope tracking power converter of FIG. 2 in accordance with some embodiments.
Figure 4:
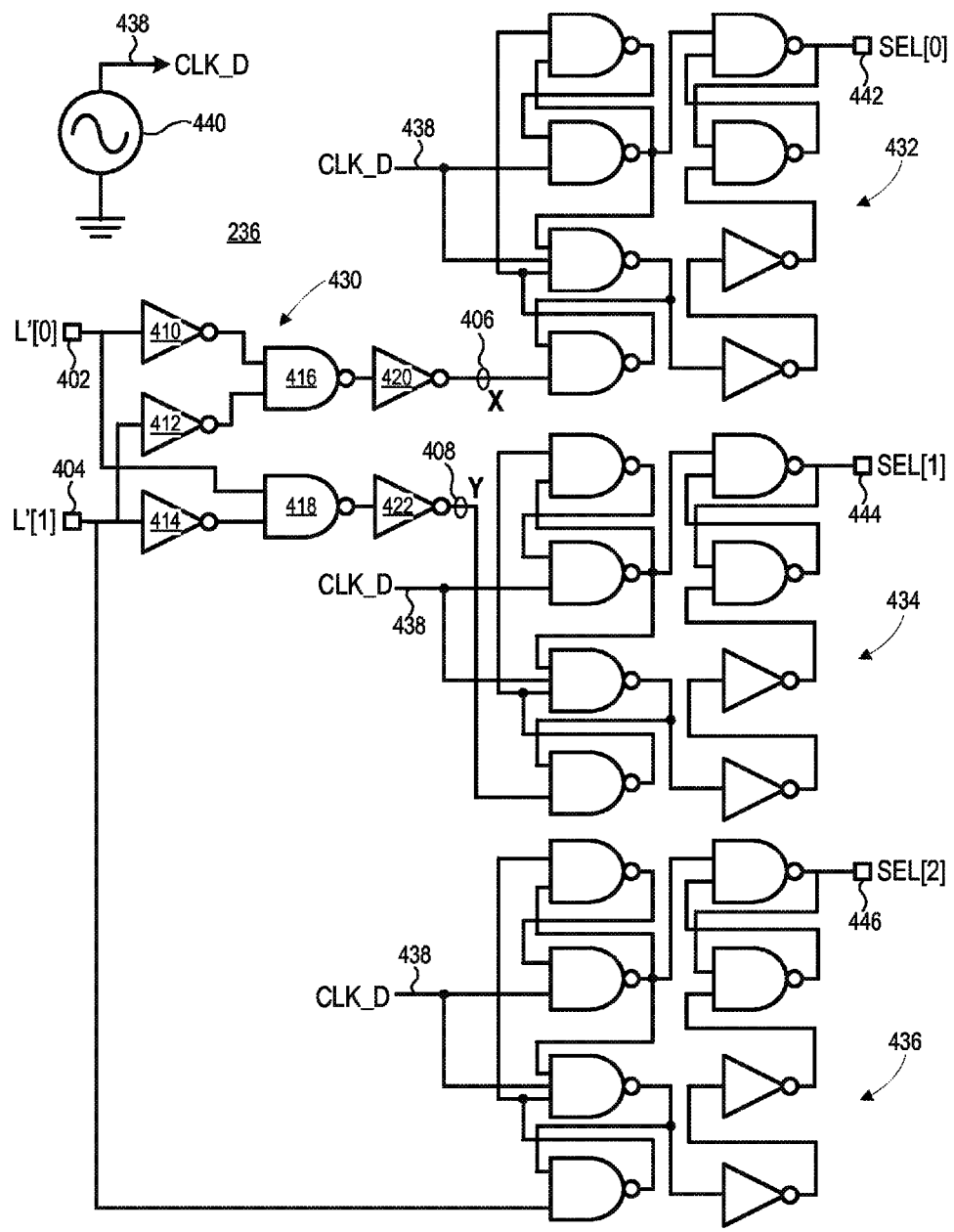
FIG. 4 is a circuit diagram illustrating a driver circuit of the envelope tracking power converter of FIG. 2 in accordance with some embodiments.

FIGS. 2-4 below illustrate example circuit implementations of the controller 124 in accordance with some embodiments. However, in other embodiments, the controller 124 instead may be implemented via a digital signal processor (DSP) (not shown) that digitally implements the described techniques for selecting between the multiple output voltage levels of the MOCP 120 to implement envelope tracking for a load carrying a varying signal. In such instances, the DSP can digitally predetermine the appropriate envelope level, and its duration, for each segment or other portion of the input RF signal 104 to be transmitted while it is still in its digital form being processed by the DSP and then generate the analog signals needed to control the switch 122 to implement the identified envelope level and envelope level duration when the corresponding segment of the input RF signal 104 is being transmitted by the power amplifier 112.

FIG. 2 illustrates an example implementation of the envelope-tracking power converter 118 in accordance with some embodiments. In the depicted example, the MOCP 120 is implemented as a switch-capacitor charge pump comprising a plurality of cascaded pump stages, such as the four pump stages 202, 204, 206, and 208 (also denoted as "pump stages 0-3") illustrated in FIG. 2. The pump stages each have an input coupled to the output of the previous stage (or an initial voltage VDD in the case of the initial pump stage 202), an input to receive one or more clock signals used to by switching logic of the pump stages to control the switching of the capacitors of the pump stage, and an output to provide a corresponding voltage that is a multiple (whole or fractional) of the voltage received at the input of the pump stage. Each pump stage includes one or more capacitors and switching logic to switch the connections between capacitors within the pump stage and with the next pump stage in the series in accordance with any of a variety of well-known switched-capacitor charge pump architectures. The voltages output at some or all of the pump stages also are output as one of the parallel output voltage levels of the MOCP 120 to the switch 122 via a corresponding output stage. The output stage can comprise, for example, a bootstrap driver to facilitate the switching operation of the switch 122, a storage capacitor to store charge in anticipation of the use of the voltage provided by the output stage by the power amplifier 112, and the like. Thus, a designer of the MOCP 120 can select a particular configuration of the number of pump stages and the configuration of each pump stage so as to provide the desired number of output voltage levels at specified voltage levels. To illustrate, FIG. 2 depicts an example implementation that provides three voltage outputs V_L, V_M, and V_H (corresponding to the voltages V_0 . . . V_N−1 of FIG. 1), whereby the pump stages 202-208 are designed such that the voltage output by the pump stage 204 is provided as the voltage level V_L via an output stage 214, the voltage output by the pump stage 206 is provided as the voltage level V_M via an output stage 216, and the voltage output by the pump stage 208 is provided as the voltage level V_H via an output stage 218. An example circuit implementation of the MOCP 120 is described below with reference to FIG. 5.

In some embodiments, the switch 122 is implemented as a set of transistors (e.g., n-type field effect transistors), whereby each transistor has a current electrode connected to a corresponding output stage of the MOCP 120, a current electrode coupled to a switch output 220 that provides the supply voltage 116, and a gate electrode to receive a corresponding line of the select signal 126. In the example implementation of FIG. 2, the switch 122 includes three transistors 224, 226, and 228. The transistor 224 selectively couples the output stage 214 to the switch output 220 based on the state of the line SEL[0] of the select signal 126. The transistor 226 selectively couples the output stage 216 to the switch output 220 based on the state of the line SEL[1] of the select signal 126. The transistor 228 selectively couples the output stage 218 to the switch output 220 based on the state of the line SEL[2] of the select signal 126. Thus, depending on the select signal 126, the transistors 224, 226, and 228 operate to provide one of the voltage levels V_L, V_M, or V_H as the dynamically-adjustable voltage level V_PA of the supply voltage 116. As described below with reference to FIG. 5, the MOCP 120 can include bootstrap drivers to facilitate the activation of the transistors 224, 226, and 228 responsive to the corresponding lines of the select signal 126. Although one example of the switch 122 is illustrated, other switch architectures can be implemented using the guidelines provided herein.

The controller 124 operates to control the switch 122 via the select signal 126 to dynamically switch the supply voltage 116 between the envelope steps represented by the voltage levels V_L, V_M, and V_H so as to provide a voltage envelope for the supply voltage 116 that tracks the RF envelope of the RF signal being amplified. To this end, the controller 124 can include a sampling circuit in the form of, for example, an analog-to-digital converter (ADC) 230, to sample the voltage level of the input RF signal 104 and provide a corresponding digital code, a peak voltage following frequency divider (PFFD) circuit 234 to limit the switching frequency of the envelope tracking process to a specified maximum threshold frequency F_MAX, and an envelope selection circuit 236 that selects the appropriate envelope step for the current voltage level sampled by the ADC 230 and synchronously drives the transistors 224-228 of the switch 122 to as to configure the switch 122 to output as the voltage level V_PA of the supply voltage 116 the one of the voltage levels V_L, V_M, or V_H that represents the selected envelope step.

In some embodiments, the ADC 230 is implemented as a flash ADC using a voltage divider 238 and a set of N−1 or N comparators to generate a level signal 244 (denoted as level "L[X]") having has N−1 or N lines that together comprise a digital code that represents the sampled current voltage level of the input RF signal 104. To illustrate, in the particular example of FIG. 2, there are three (N=3) envelope steps, represented as voltage levels V_L, V_M, and V_H, and thus the ADC 230 implements 2 (N−1) comparators, comparators 240 and 242, to generate a level signal 244 with two lines, or bits, denoted "L[0]" and "L[1]." The comparator 240 includes an input to receive a lower reference voltage REF1 from the voltage divider 238, an input to receive the input RF signal 104, and an output to provide the first line L[0] of the level signal 244 based on the relationship between the voltage level of the input RF signal 104 and the reference voltage REF1. The comparator 242 includes an input to receive a higher reference voltage REF2 from the voltage divider 238, an input to receive the input RF signal 104, and an output to provide the second line L[1] of the level signal 244 based on the relationship between the voltage level of the input RF signal 104 and the reference voltage REF2. Thus, the level signal 244 is set to [00] when the voltage level of the input RF signal 104 is below REF1, to [01] when the voltage level of the input RF signal 104 is between REF1 and REF2, and to [11] when the voltage level of the input RF signal 104 is above REF2. Thus, the voltage references REF1 and REF2 are selected to trigger corresponding changes in the envelope step implemented for the supply voltage 116.

The frequency of the input RF signal 104 can impact the switching frequency of the level signal 244 and therefore higher frequencies of the input RF signal 104 could lead to a situation whereby the switching losses from the transistors implemented in the PFFD circuit 234, the envelope selection circuit 236, and the switch 122 exceed the power savings provided by the envelope tracking process. To prevent this scenario, the controller 124 employs the PFFD circuit 234 to limit the frequency of the level signal 244 for its use in controlling the dynamic switching of the supply voltage 116 among the plurality of envelope steps represented by the multiple output voltage levels provided by the MOCP 120. To this end, the PFFD circuit 234 includes an input to receive the digital codes represented in the level signal 244 from the ADC 230, an input to receive a periodic signal 248 having a frequency F_MAX that represents the maximum switching frequency to be employed for envelope tracking, and an output to provide a frequency-limited, or filtered, representation of the level signal 244, which is referred to herein as filtered level signal 246 or "L[X]". The periodic signal 248 can be implemented as, for example, a clock signal supplied by a clock source 250. Thus, for ease of reference, the periodic signal 248 is also referred to herein as "clock signal 248," although the periodic signal 248 is not limited to clock signal implementations.

In operation, the PFFD circuit 234 samples the voltage level of the input RF signal 104 via the ADC 230 for each sample period represented by a corresponding cycle period of the clock signal 248 and provides a digital code representing the sampled voltage level via the level signal 244. While the frequency of the level signal 244 is below the maximum threshold frequency F_MAX, the PFFD circuit 234 provides the level signal 244 as the filtered level signal 246 without frequency attenuation, and thus permitting the envelope selection circuit 236 to operate in a full envelope tracking mode whereby the supply voltage 116 can be switched between envelope steps at the same frequency as the input RF signal 104 as necessary. However, when the frequency of the level signal 244 increases to or otherwise meets the maximum threshold frequency F_MAX, the sample period employed by the PFFD circuit 234 via the clock signal 248 becomes greater than the effective period of the level signal 244, and thus the PFFD circuit 234 effectively attenuates the switching frequency of the level signal 244 by preventing the resulting filtered level signal 246 from switching at a frequency greater than the maximum threshold frequency F_MAX. Accordingly, in such instances, the envelope selection circuit 236, in effect, switches to a "partial" envelope tracking mode whereby the supply voltage 116 is switched between envelope steps at the maximum threshold frequency F_MAX, rather than at the higher frequency of the input RF signal 104.

Instead of changing the envelope step of the supply voltage 116 immediately as the voltage of the input RF signal 104 changes, the PFFD circuit 234 and the envelope selection circuit 236 together operate to control envelope step changes to the supply voltage 116 based on the highest voltage level reached by the input RF signal 104 in the sample period manifested by the clock period of the clock signal 248. Thus, while the controller 124 is in the partial envelope tracking mode, the supply voltage 116 more loosely tracks the RF envelope of the input RF signal 104 compared to when the controller 124 is in the full envelope tracking mode. However, as the maximum threshold frequency F_MAX can be set based on experimentation or modeling, or configured to the frequency that reflects the point where the switching losses become greater than the benefits gained from envelope tracking, the partial envelope mode allows some degree of envelope tracking (and thus saving power) while preventing the net negative power savings that would otherwise occur with full envelope tracking at higher frequencies using conventional or standard transistor technologies. Example circuit implementations of the PFFD circuit 234 is described below with reference to FIG. 3.

The envelope selection circuit 236 receives the filtered level signal 246 and selects an envelope step based on the level represented by the filtered level signal 246 for a corresponding sample period. In the example of FIG. 2 whereby there are three envelope steps, the envelope selection circuit 236 decodes the two values L'[0] and L'[1] of the filtered level signal 246 into three lines, denoted "SEL[0]", "SEL[1]," and "SEL[2]" of the select signal 126, and which together represent which one of the of the three envelope steps V_L, V_M, or V_H is to be provided as the supply voltage 116 for the corresponding sample period. As the switch 122 is implemented using the three transistors 224, 226, and 228 as shown, the filtered level signal 246 is decoded such that the three control signals SEL[0-3] are "one-hot," that is, only one of the control signals is asserted at any given time. This decoding may be implemented using hard-coded logic, or it may be implemented using, for example, a look-up table in memory. Further, as skew may be introduced the signaling, the envelope selection circuit 236 may implement synchronization logic to ensure that the transistors 224, 226, and 228 of the switch 122 change state at the same time so as to avoid voltage spikes or other glitches in the supply voltage 116. An example logic circuit implementation of the envelope selection circuit 236 is illustrated below with reference to FIG. 4.

FIG. 3 illustrates an example implementation of the PFFD circuit 234 in accordance with some embodiments. In the depicted embodiment, the PFFD circuit 234 employs a set-reset (SR) latch circuit for each line of the level signal 244. Thus, for the example implementation of the controller 124 detailed in FIG. 2, the PFFD circuit 234 employs SR latch circuits 302 and 304 for lines L[0] and L[1], respectively, of the level signal 244. The SR latch circuit 302 includes an input 312 to receive the line L[O], a clock input 314 to receive the clock signal 248 having the threshold frequency F_MAX, and either an output 316 or an output 317 to provide the line L'[0] for the filtered level signal 246.

The SR latch circuit 302 illustrated in FIG. 3 represents a combination of two alternative circuit implementations. In an implementation referred to as the "low-on-fault implementation, the SR latch circuit 302 can comprise NOR gates 321 and 322, NAND gate 323, and AND gate 324. The NOR gate 321 comprises an input to receive the line L[0], an input coupled to the output of the NOR gate 322. The NOR gate 322 includes an input coupled to receive the clock signal 248 and an input coupled to the output of the NOR gate 321. The NAND gate 323 includes an input to receive the line L[0] and an input to receive the clock signal 248. The AND gate 324 includes an input coupled to the output of the NAND gate 323, an input coupled to the output of the NOR gate 321, and an output coupled to the output 316 to provide the line L'[0]. In an alternative implementation referred to as the "high-on-fault" implementation, the SR latch circuit 302 can comprise the NOR gates 321 and 322, an AND gate 325, and an OR gate 326. The AND gate comprises an input to receive the line L[0] and an input to receive the clock signal 248. The OR gate 326 includes an input coupled to the output of the NOR gate 321, an input coupled to the output of the AND gate 325, and an output coupled to the output 317 to provide the line L[0]. The SR latch circuit 304 may be similarly configured with respect to the lines L[1] and L'[1].

As illustrated by the arrangement of the logic gates of the logic diagram 320, the SR latch circuit 302 functions as a memory unit for the line L'[0] with respect to the line L[0]. When line L[0] is asserted (that is, "goes high") during a sample period, regardless of duration and the behavior of L[0] onwards, the SR latch circuit 302 "remembers/records" the event and sets or asserts the line L[0] to "1" until the clock signal 248 is next asserted (thereby signaling the end of the sample period) and resets the line L'[0] to low or "0". However, there may be a chance that both L[0] and the clock signal 248 assert themselves simultaneously, which could introduce a fault whereby the line L[0] is attempted to be set to "0" and "1" at the same time. Accordingly, the SR latch circuit 302 employs a fault protection circuit either in the form of the NAND gate 323 and the AND gate 324 for the low-on-fault implementation or in the form of the AND gate 325 and the OR gate 326 in the high-on-fault implementation. This fault protection circuit, which is dormant and "invisible" to the PFFD 234 during non-fault operation, dictates the final output. A designer can decide to implement the high-on-fault implementation, which sets the output 316 to logic high when both the line L[0] and the clock signal 248 are high, or low-on-fault implementation, which sets the output 317 to logic low when both the line L[0] and the clock signal 248 are high.

In conjunction with the fault protection circuit, the occurrence of this fault condition can be reduced by reducing the pulse width of the clock signal 248. This is because the clock signal 248 acts as the reset signal for the SR latch circuit 302, and thus a reduced pulse width of the clock signal reduces the likelihood of a concurrent assertion of the clock signal 248 and the line L[0]. As such, the pulse width of the clock signal 248 can be configured so as to be sufficiently long enough to satisfy the hold time requirement of the logic gates, but not much longer. For example, a pulse width of 10 nanoseconds (nS) or less for a 20 MHz application may be sufficient.

Thus, in this manner if the line L[1] is asserted during at any time between active high states of the clock signal 248, the output of the SR latch circuit 302 will be set to "1", even if the line L[1] is subsequently deasserted during the same clock period of the clock signal 248. The SR latch circuit 304 is similarly configured for the line L[1]. Thus, the SR latch circuits 302 and 304 together operate to "store" and output the highest voltage (with respect to the two reference voltages REF1 and REF2, FIG. 2) present in the input RF signal 104 over a sample period represented by a corresponding cycle of the clock signal 248. As such, the frequency F_MAX of the clock signal 248 is the maximum frequency at which the filtered level signal 246 can change. If the frequency of the input RF signal 104 is less than the frequency F_MAX, the filtered level signal 246 will vary at a frequency equal to or less than the frequency of the input RF signal 104. If, however, the frequency of the input RF signal 104 is greater than the frequency F_MAX, the frequency of changes to the filtered level signal 246 is limited to the frequency F_MAX. This limit on the frequency of change can avoid excessive switching losses, but can have the result of causing the envelope tracking to less accurately follow the RF envelope of the input RF signal. However, because the SR latch circuits 302 and 304 "remember" the highest voltage of the input RF signal 104 that occurred during the clock period of the clock signal 248, filtered level signal 246 will accurately reflects the envelope step needed to provide sufficient power for the maximum instantaneous power requirement of the input RF signal 104 during the clock period, and thus ensuring that the envelope tracking does not fail to provide sufficient voltage to the power amplifier 112 (FIG. 1).

Although FIG. 3 illustrates one example implementation of the PFFD circuit 234, the PFFD circuit 234 can be implemented using any of a variety of memory-type circuits that are capable of recording or "remembering" a high event on the corresponding line L[X] between two reset pulses that represent a corresponding sample period. Such circuits may implement, for example, J-K latches, flip-flops, and the like.

FIG. 4 illustrates an example circuit implementation of the envelope selection circuit 236 in accordance with some embodiments. The envelope selection circuit 236 includes decode logic 430 having an input 402 to receive the line L'[0], an input 404 to receive the line L'[1], an output 406 to provide an output signal X and an output 408 to provide an output signal Y. The decode logic 430 further includes inverters 410, 412, 414, and NAND gates 416, 418, 420, and 422. The inverters may be implemented as NAND gates with their inputs tied together. In operation, the decode logic 430 asserts the output signal X and deasserts the output signal Y when L'[0] and L'[1] both are unasserted (that is, when the voltage of the input RF signal 104 is below REF1), deasserts the output signal X and asserts the output signal Y when L'[0] is asserted and L'[1] is unasserted (that is, when the voltage of the input RF signal 104 is between REF 1 and REF2), and deasserts both the output signal X and the output signal Y when L'[0] and L'[1] are both asserted (that is, when the voltage of the input RF signal 104 is above REF2).

The envelope selection circuit 236 further includes three sets of driver/synchronization logic 432, 434, and 436. The driver/synchronization logic 432 has an input coupled to the output 406, an input to receive a clock signal 438 (also denoted as "CLK_D") or other periodic signal generated by, for example, a clock source 440, and an output 442 to drive the line SEL[0] of the select signal 126 (FIG. 2). The driver/synchronization logic 434 has an input coupled to the output 408, an input to receive the clock signal 438, and an output 444 to drive the line SEL[1] of the select signal 126. The driver/synchronization logic 436 has an input to receive the line L'[1] of the filtered level signal 246, an input to receive the clock signal 438, and an output 446 to drive the line SEL[2] of the select signal 126. As the clock signal 248 serves to control the frequency at which the controller 124 calculates the next course of action and as the clock signal 438 serves to control the synchronization rate at which the envelope selection circuit 236 carries out those actions, the clock frequency of the clock signal 438 can be set to the same frequency as the clock signal 248 (that is, equal to F_MAX) with the rising edge of the clock signal 248 coming after the rising edge of the clock signal 438 so that the action decision and the action execution occur at the same rate.

In the logic configuration depicted in FIG. 4, the decode logic 430 and the driver/synchronization logic 432, 434, and 436 together operate to select via the select signal 126 (FIG. 2) the appropriate envelope step for the supply voltage 116 from the filtered level signal 246. As noted above, due to the example configuration of the switch 122, only one of SEL[0], SEL[1], and SEL[2] is to be asserted at any given point in time (that is, the select signal 126 is "one-hot"). Accordingly, the decode logic 430 and the driver/synchronization logic 432, 434, and 436 together operate to assert the line SEL[0] and deassert the lines SEL[1] and SEL[2] in the event that both L'[0] and L'[1] are unasserted (thus reflecting that the sampled voltage of the input RF signal 104 was below the reference voltage REF1, FIG. 2), which causes the switch 122 to provide the voltage V_L as the voltage level V_PA of the supply voltage 116 (that is, set the envelope step to V_L). The decode logic 430 and the driver/synchronization logic 432, 434, and 436 together operate so as to assert the line SEL[1] and deassert the lines SEL[0] and SEL[2] in the event that L'[0] is asserted and L'[2] is unasserted (thus reflecting that the sampled voltage of the input RF signal 104 was between the reference voltages REF1 and REF2, FIG. 2), which causes the switch 122 to provide the voltage V_M as the voltage level V_PA of the supply voltage 116 (that is, set the envelope step to V_M). The decode logic 430 and the driver/synchronization logic 432, 434, and 436 together operate so as to assert the line SEL[2] and deassert the lines SEL[0] and SEL[1] in the event that both L'[1] and L'[2] are asserted (thus reflecting that the sampled voltage of the input RF signal 104 was above reference voltage REF2, FIG. 2), which causes the switch 122 to provide the voltage V_H as the voltage level V_PA of the supply voltage 116 (that is, set the envelope step to V_H). The driver/synchronization logic 432, 432, and 436 use the clock signal 428 to synchronize the state changes of SEL[0], SEL[1], and SEL[2] to that they switch concurrently so as to avoid voltage spikes or other glitches in the voltage level V_PA.

Figure 5:
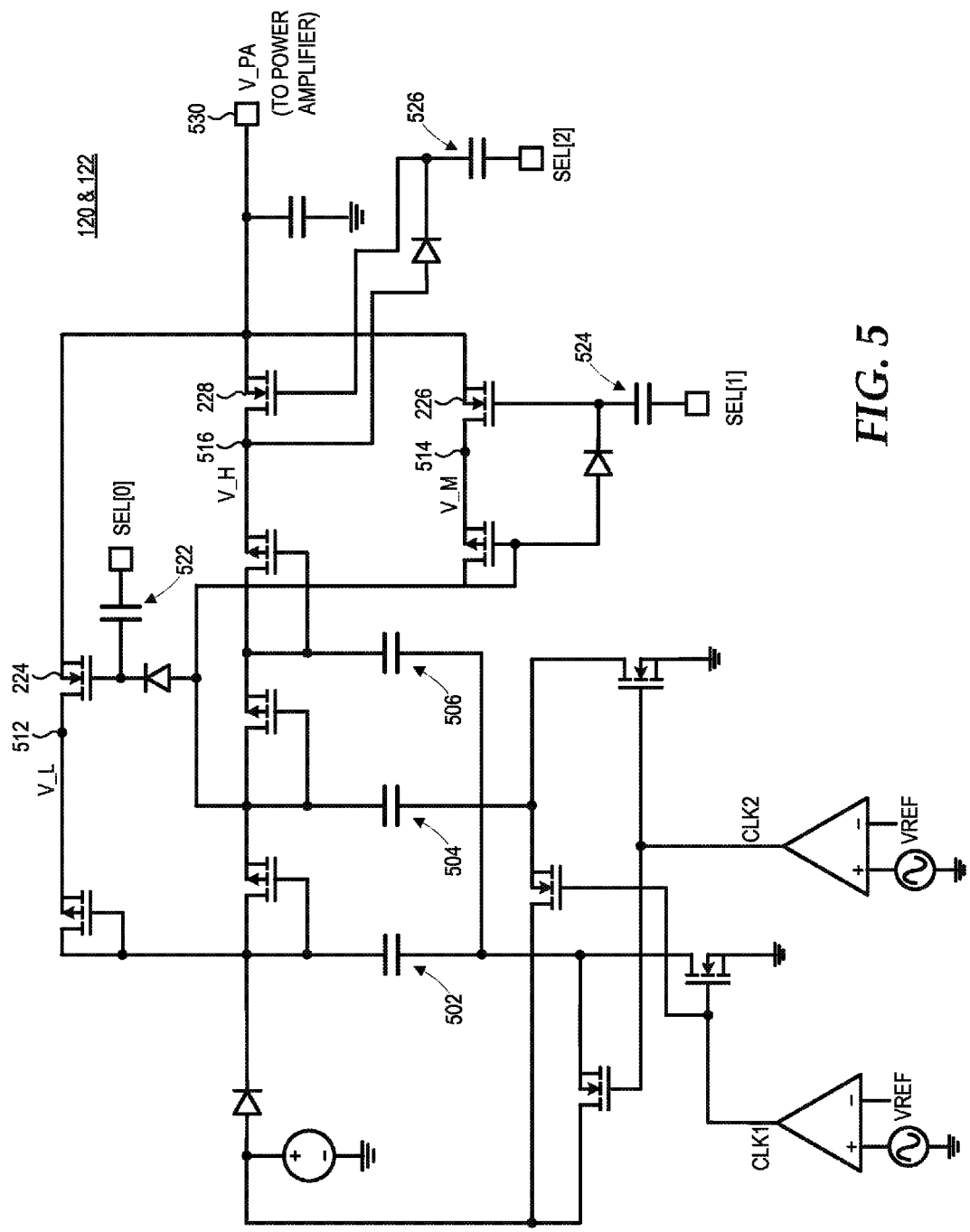
FIG. 5 is a circuit diagram illustrating a multiple-output charge pump in accordance with some embodiments.

FIG. 5 illustrates an example circuit implementation of the MOCP 120 and the switch 122 in accordance with some embodiments. In the depicted example, the MOCP 120 comprises a single-mode charge pump having three capacitor pump stages 502, 504, and 506 that are switched via the illustrated circuit configuration using generated clock signals CLK1 and CLK2 so as to simultaneously provide the output voltage levels V_L, V_M, and V_H at nodes 512, 514, and 516, respectively. The switch 122 is implemented as the transistors 224, 226, and 228, which are controlled via the select lines SEL[0], SEL[1], and SEL[2], respectively, to selectively connect one of the voltage levels V_L, V_M, and V_H to an output node 530, which in turn is connected to the power input of the power amplifier 112 (FIG. 1) so as to provide the supply voltage 116 (FIG. 1) to the power amplifier 112. Further, in some embodiments, the MOCP 120 can implement bootstrap drivers 522, 524, and 526 for transistors 224, 226, and 228, respectively, whereby each bootstrap driver (implementing the diode and capacitor configuration shown in FIG. 5) feeds the corresponding voltage level output of the MOCP 120 to the gate of the corresponding transistor of the switch 122 to help turning the corresponding switch on.

Although a single-mode charge pump like the one illustrated provides for simpler control, when complementary MOS (CMOS) technology is used to design the RF amplifier 102, a multi-mode charge pump instead may be used to reduce changes in voltage due to transitions between full loads and light loads, thereby improving efficiency. Moreover, the concurrent supply of a plurality of different voltage levels for selection as the supply voltage 116 is not limited to the charge pump implementations described above. Rather, any of a variety of power supply circuits capable of concurrently supplying multiple voltage levels may be used in accordance with the teachings provided herein.

The functionality described above may be implemented by one or more processors executing one or more software programs tangibly stored at a computer readable medium, and whereby the one or more software programs comprise instructions that, when executed, manipulate the one or more processors to perform one or more functions described above. In some embodiments, the components and techniques described above are implemented in a system comprising one or more integrated circuit (IC) devices (also referred to as integrated circuit packages or microchips. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 6:
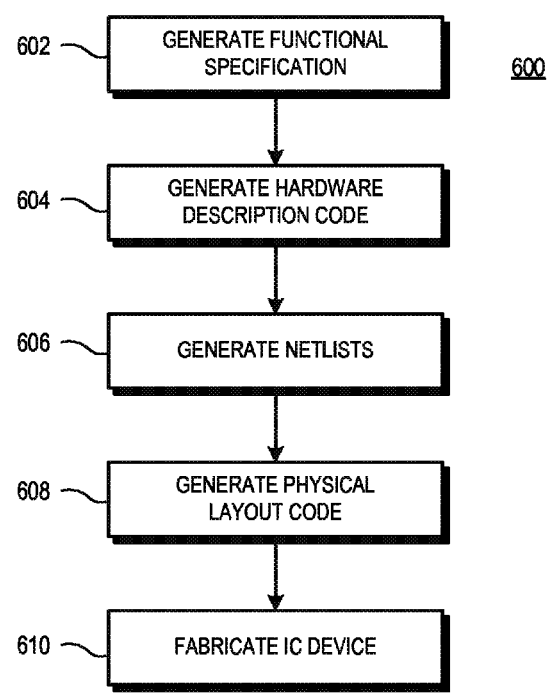
FIG. 6 is a flow diagram illustrating a method for designing and fabricating an integrated circuit (IC) device in accordance with some embodiments.

FIG. 6 is a flow diagram illustrating an example method 600 for the design and fabrication of an IC device implementing one or more aspects. As noted above, the code generated for each of the following processes is stored or otherwise embodied in computer readable storage media for access and use by the corresponding design tool or fabrication tool.

At block 602 a functional specification for the IC device is generated. The functional specification (often referred to as a micro architecture specification (MAS)) may be represented by any of a variety of programming languages or modeling languages, including C, C++, SystemC, Simulink™, or MATLAB™.

At block 604, the functional specification is used to generate hardware description code representative of the hardware of the IC device. In at some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 606 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 608, one or more EDA tools use the netlists produced at block 606 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 610, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. An electronic device comprising:
a charge pump comprising a plurality of outputs to concurrently provide a plurality of different voltage levels;
a switch coupled to the plurality of outputs and comprising an output to provide a supply voltage that is selected from one of the plurality of different voltage levels;
a controller to control the switch based on an analog input signal; and
a peak following frequency divider to limit a switching frequency of the plurality of different voltage levels to a threshold frequency.

2. The electronic device of claim 1, wherein the controller is to control the switch to select a voltage level of the plurality of voltage levels responsive to a sampled voltage level of the analog input signal.

3. The electronic device of claim 2, wherein the controller comprises:
an input to receive the analog input signal;
an input to receive a periodic signal; and
a sampling circuit to provide a value representing the highest voltage of the analog input signal for a corresponding period of the periodic signal as the sampled voltage level of the analog input signal.

4. The electronic device of claim 1, wherein the charge pump comprises a switched-capacitor charge pump.

5. The electronic device of claim 1, further comprising:
a power amplifier comprising a signal input to receive a representation of the analog input signal, a power input coupled to the output of the switch, and an output to provide an amplified representation of the analog input signal.

6. The electronic device of claim 5, wherein the power amplifier comprises a radio frequency amplifier.

7. An electronic device comprising,
a switch comprising a plurality of inputs to concurrently receive a plurality of different voltage levels and comprising an output to provide a supply voltage selected from one of the plurality of different voltage levels;
an envelope tracking controller comprising an input to receive an analog input signal, an input to receive a periodic signal, and an output coupled to the switch, wherein the controller is to control the switch to selectively switch, at a frequency that is not greater than the frequency of the periodic signal, the supply voltage between the plurality of different voltage levels responsive to sampled voltage levels of the analog input signal, wherein the envelope tracking controller comprises:
an analog-to-digital converter (ADC) to provide digital codes representing sampled voltage levels of the analog input signal; and
a sampling circuit to provide the highest digital code provided by the ADC during a corresponding period of the periodic signal as a sampled voltage level for a corresponding sample period, wherein the sampling circuit comprises a set of set-reset (SR) latches, each SR latch having an input to receive a corresponding output line from the ADC, an input to receive the periodic signal, and an output to provide a corresponding bit of a value representing the sampled voltage level for the corresponding sample period;
an envelope selection circuit to control the switch to provide, as the supply voltage, a voltage level selected from the plurality of different voltage levels responsive to the sampled voltage level for the corresponding sample period; and
wherein each SR latch includes a fault protection circuit to mitigate a potential fault due to concurrent assertion of both a signal on the corresponding output line from the ADC and the periodic signal.

8. The electronic device of claim 7, wherein each SR latch comprises:
a first NOR gate, a second NOR gate, a NAND gate, and an AND gate, wherein:
the first NOR gate comprises an input to receive the corresponding bit of the digital code, an input coupled to an output of the second NOR gate, and an output;
the second NOR gate comprises an input to receive the periodic signal and an input coupled to the output of the first NOR gate;
the NAND gate comprises an input to receive the corresponding bit of the digital code, an input to receive the periodic signal, and an output; and
the AND gate comprises an input coupled to the output of the first NOR gate, an input coupled to the output of the NAND gate, and an output to provide the corresponding bit of the value representing the sampled voltage level for the corresponding sample period.

9. The electronic device of claim 7, wherein each SR latch comprises:
a first NOR gate, a second NOR gate, an AND gate, and an OR gate, wherein:
the first NOR gate comprises an input to receive the corresponding bit of the digital code, an input coupled to an output of the second NOR gate, and an output;
the second NOR gate comprises an input to receive the periodic signal and an input coupled to the output of the first NOR gate;
the AND gate comprises an input to receive the corresponding bit of the digital code, an input to receive the periodic signal, and an output; and
the OR gate comprises an input coupled to the output of the first NOR gate, an input coupled to the output of the AND gate, and an output to provide the corresponding bit of the value representing the sampled voltage level for the corresponding sample period.

10. The electronic device of claim 7, further comprising:
a switched-capacitor charge pump comprising a plurality of outputs to concurrently provide the plurality of different voltage levels.

11. The electronic device of claim 7, further comprising:
a power amplifier comprising a signal input to receive a representation of the analog input signal, a power input coupled to the output of the switch, and an output to provide an amplified representation of the analog input signal.

12. A computer readable medium storing code to adapt at least one computer system to perform a portion of a process to fabricate at least part of an electronic device, the electronic device comprising:
a charge pump comprising a plurality of outputs to concurrently provide a plurality of different voltage levels;
a switch coupled to the plurality of outputs and comprising an output to provide a supply voltage that is selected from one of the plurality of different voltage levels;
a controller to control the switch based on an analog input signal; and
a peak following frequency divider to limit a switching frequency of the plurality of different voltage levels to a threshold frequency.

13. The computer readable medium of claim 12, wherein the controller is to control the switch to select a voltage level of the plurality of voltage levels responsive to a sampled voltage level of the analog input signal.

14. The computer readable medium of claim 13, wherein the controller comprises:
an input to receive the analog input signal;
an input to receive a periodic signal; and
a sampling circuit to provide a value representing the highest voltage of the analog input signal for a corresponding period of the periodic signal as the sampled voltage level of the analog input signal.

15. The computer readable medium of claim 12, wherein the charge pump comprises a switched-capacitor charge pump.

16. The electronic device of claim 7, wherein the ADC comprises a flash ADC.

* * * * *